US012602753B2

(12) United States Patent
Maruyama et al.

(10) Patent No.: US 12,602,753 B2
(45) Date of Patent: Apr. 14, 2026

(54) ULTRASOUND IMAGE PROCESSING APPARATUS

(71) Applicant: FUJIFILM Healthcare Corporation, Kashiwa (JP)

(72) Inventors: Misaki Maruyama, Chiba (JP); Masanori Hisatsu, Chiba (JP); Hiroshi Kuribara, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 238 days.

(21) Appl. No.: 18/225,348

(22) Filed: Jul. 24, 2023

(65) Prior Publication Data

US 2024/0046423 A1 Feb. 8, 2024

(30) Foreign Application Priority Data

Aug. 2, 2022 (JP) ................................. 2022-123500

(51) Int. Cl.
*G06T 5/70* (2024.01)
*G01S 7/52* (2006.01)
(Continued)

(52) U.S. Cl.
CPC ............ *G06T 5/70* (2024.01); *G01S 7/52077* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS

| | | | |
|---|---|---|---|
| 8,254,654 B2 | 8/2012 | Yen et al. | |
| 2009/0141957 A1* | 6/2009 | Yen ..................... | G01S 15/8977 |
| | | | 600/437 |
| 2020/0226721 A1* | 7/2020 | Kishimoto .......... | G01S 15/8977 |

FOREIGN PATENT DOCUMENTS

| | | |
|---|---|---|
| JP | H09-091421 A | 4/1997 |
| JP | H11-151241 A | 6/1999 |

(Continued)

OTHER PUBLICATIONS

Matrone, G., Savoia, A. S., Caliano, G., & Magenes, G. (2015). The Delay Multiply and Sum Beamforming Algorithm in Ultrasound B-Mode Medical Imaging. IEEE Transactions on Medical Imaging, 34(4), 940-949. https://doi.org/10.1109/TMI.2014.2371235 (Year: 2015).*

(Continued)

*Primary Examiner* — Amandeep Saini
*Assistant Examiner* — Caroline Tabancay Duffy
(74) *Attorney, Agent, or Firm* — Paul Teng

(57) ABSTRACT

A delay processor includes a plurality of delay units and individually delays reception signals which are respectively output from a plurality of transducers. A signal combiner combines the delayed reception signals to generate a phase-aligned reception signal. An evaluation value computing unit finds a noise evaluation value for the phase-aligned reception signal based on the delayed reception signals. A noise reducing unit includes an adjustment unit which performs a smoothing operation using a morphological operation on the noise evaluation value to convert the noise the evaluation value into a weight, and multiplies the phase-aligned reception signal by the weight, to perform a noise reducing process. An image generator generates ultrasound image data based on reception signals obtained by perform- (Continued)

ing the noise reducing process, and displays an ultrasound image based on the ultrasound image data.

19 Claims, 15 Drawing Sheets

(51) Int. Cl.

| | | |
|---|---|---|
| *G06T 5/20* | (2006.01) | |
| *G06T 5/50* | (2006.01) | |
| *G06T 7/00* | (2017.01) | |

(52) U.S. Cl.
CPC .. *G06T 7/0002* (2013.01); *G06T 2207/10132* (2013.01); *G06T 2207/20212* (2013.01); *G06T 2207/30168* (2013.01)

(56) References Cited

FOREIGN PATENT DOCUMENTS

| | | | |
|---|---|---|---|
| JP | 2006-204923 | A | 8/2006 |
| JP | 2012-152311 | A | 8/2012 |
| JP | 2012-231819 | A | 11/2012 |
| JP | 2014-033914 | A | 2/2014 |
| JP | 2015-058046 | A | 3/2015 |
| JP | 2015-213575 | A | 12/2015 |
| JP | 2015-213673 | A | 12/2015 |
| JP | 2020-110296 | A | 7/2020 |
| JP | 2020-534903 | A | 12/2020 |

OTHER PUBLICATIONS

Lu, S., Li, R., Zhao, Y., Yu, X., Wang, D., & Wan, M. (2020). Dual apodization with cross-correlation combined with robust Capon beamformer applied to ultrasound passive cavitation mapping. Medical Physics (Lancaster), 47(5), 2182-2196. https://doi.org/10.1002/mp.14093 (Year: 2020).*

Hisatsu, M., Mori, S., Arakawa, M., & Kanai, H. (2020). Generalized coherence factor estimated from real signals in ultrasound beamforming. Journal of Medical Ultrasonics (2001), 47(2), 179-192. https://doi.org/10.1007/s10396-019-01004-7. (Year: 2020).*

Chi Hyung Seo, & Yen, J. (2009). Evaluating the robustness of dual apodization with cross-correlation. IEEE Transactions on Ultrasonics, Ferroelectrics, and Frequency Control, 56(2), 291-303. https://doi.org/10.1109/TUFFC.2009.1038. (Year: 2009).*

Feb. 3, 2026 Japanese official action (and machine translation in English thereof) in connection with Japenese Patent Application No. 2022-123500.

\* cited by examiner $$s_{i,j}(1) \qquad s_{i,j}(M)$$

24

EVALUATION VALUE
COMPUTING UNIT $\rightarrow Pij$

ULTRASOUND IMAGE PROCESSING APPARATUS

CROSS REFERENCE TO RELATED APPLICATION

This application claims priority to Japanese Patent Application No. 2022-123500 filed on Aug. 2, 2022, which is incorporated herein by reference in its entirety including the specification, claims, drawings, and abstract.

TECHNICAL FIELD

The present disclosure relates to an ultrasound image processing apparatus, and in particular, to a technique for reducing noise shown in an ultrasound image.

BACKGROUND

Ultrasound diagnostic apparatuses have been widely used, in which an ultrasound wave is transmitted to an examination subject to generate ultrasound image data based on a received ultrasound wave reflected from the examination subject. Processes to improve quality of an image are performed on a reception signal based on the ultrasound wave reflected from the examination subject and the ultrasound image data acquired based on the received signal.

Processes to reduce electrical noise and acoustic noise have been known as processing performed on the reception signal. For example, a band pass filter is used for the purpose of reducing the electrical noise. In addition, signal processing based on a coherence factor method and a DAX (Dual Apodization with Cross-correlation) method have been known as a process to reduce various types of acoustic noise resulting from a side lobe, a grating lobe, and a disturbance in a propagation property of an ultrasound wave.

Meanwhile, a process to reduce speckle noise is performed on ultrasound image data. The speckle noise denotes a pattern of high and low levels of brightness caused by interference between receptions signals of an ultrasound wave. The speckle noise can cause variations in brightness of a biotissue which is intrinsically uniform, render boundaries of the biotissue unclear, or cause other defects, resulting in deteriorated visibility of an image of the biotissue. To avoid this, image processing, such as smoothing and edge enhancements, may be performed in some cases.

Below-listed Patent Document 1 describes signal processing based on the coherence factor method. Patent Document 2 describes signal processing based on the DAX method. Patent Document 3 describes a process to reduce speckle noise contained in an ultrasound image.

CITATION LIST

Patent Literature

Patent Document 1: JP 2012-152311 A
Patent Document 2: U.S. Pat. No. 8,254,654 B
Patent Document 3: JP 2020-110296 A In general, acoustic noise in an ultrasound image can be suppressed through signal processing based on the coherence factor method and the DAX method, while an extent of brightness dispersion of speckle noise may be increased in some cases. When the extent of brightness dispersion of speckle noise is increased, the image processing performed to reduce speckle noise may not provide sufficient effects.

For example, the image processing may render speckle noise rather noticeable, resulting in deterioration in visibility of tissue structure.

An object of the present disclosure is to generate ultrasound image data in which both acoustic noise and speckle noise are reduced.

SUMMARY

The present disclosure relates to an ultrasound image processing apparatus characterized by including a delay processor configured to perform a delay process to individually delay reception signals which are respectively output from a plurality of transducers installed in an ultrasound probe, a signal combiner configured to combine the delayed reception signals to generate a phase-aligned reception signal, an evaluation value computing unit configured to find a noise evaluation value for the phase-aligned reception signal based on the delayed reception signals, a noise reducing unit configured to perform a noise reducing process on the phase-aligned reception signal based on the noise evaluation value, and an image generator configured to generate image data based on the phase-aligned reception signal obtained by performing the noise reducing process.

In an embodiment, the evaluation value computing unit is configured to perform an operation based on a coherence factor method, on each of the delayed reception signals to find the noise evaluation value.

In an embodiment, the evaluation value computing unit is configured to perform, on each of the delayed reception signals, a first weighted sum operation based a first reception aperture function and a second weighted sum operation based on a second reception aperture function, and find the noise evaluation value based on a result of a cross-correlation operation between a signal acquired by the first weighted sum operation and a signal acquired by the second weighted sum operation.

In an embodiment, the noise reducing process includes performing an adjustment process on the noise evaluation value to generate a weight of the noise evaluation value and multiplying the phase-aligned reception signal by the weight.

In an embodiment, the adjustment process includes acquiring the weight of the noise evaluation value based on a conversion function of associating the noise evaluation value with the weight, the conversion function designed to give a lower limit to the weight.

In an embodiment, the conversion function is selected from a plurality of different candidate functions of associating the noise evaluation value with the weight, based on a position in a depth direction, the position at which the noise evaluation value is acquired, the plurality of different candidate functions designed to give different lower limits to the weight.

In an embodiment, the signal combiner is configured to generate the phase-aligned reception signal for each of a plurality of reception beams generated by a scan, the evaluation value computing unit is configured to find an evaluation value distribution denoting a distribution of noise evaluation values in a scanning region in which the reception beams are scanned, and the adjustment process includes performing a smoothing operation on the evaluation value distribution to generate the weight.

In an embodiment, the signal combiner is configured to generate the phase-aligned reception signal for each of a plurality of reception beams generated by a scan, the noise reducing unit is configured to find a weight distribution denoting a distribution of weights in a scanning region in which the reception beams are scanned, and the ultrasound image processing apparatus further includes an acoustic noise region determining unit configured to determine, based on the weight distribution, whether a region in an image represented by the image data is an acoustic noise region or a structure region which is not the acoustic noise region.

In an embodiment, the signal combiner is configured to generate the phase-aligned reception signal for each of a plurality of reception beams generated by a scan, the evaluation value computing unit is configured to find an evaluation value distribution denoting a distribution of noise evaluation values in a scanning region in which the reception beams are scanned, and the ultrasound image processing apparatus further includes an acoustic noise region determining unit configured to determine, based on the evaluation value distribution, whether a region in an image represented by the image data is an acoustic noise region or a structure region which is not the acoustic noise region.

In an embodiment, the image generator is configured to apply band pass filters to the phase-aligned reception signal, the band pass filters being different between the acoustic noise region and the structure region.

In an embodiment, the image generator is configured to apply image filters to the image data, the image filters being different between the acoustic noise region and the structure region.

In an embodiment, the image generator is configured to perform an opening operation on the acoustic noise region and perform a closing operation to the structure region, the acoustic noise region and the structure region being both contained in an image represented by the image data.

According to the present disclosure, it becomes possible to generate ultrasound image data in which both acoustic noise and speckle noise are reduced.

BRIEF DESCRIPTION OF DRAWINGS

Embodiments of the present disclosure will be described based on the following figures, wherein.

DESCRIPTION OF EMBODIMENTS

An embodiment of the present disclosure will be described with reference to the drawings. The same components shown in a plurality of drawings are designated by the same reference signs, and description related to those components will not be repeated. It should be noted that an unspecified one of a plurality of components designated by a reference sign in the form of "x-m" where m is a positive integer is designated using a reference letter "x" as a component x.

Figure 1:
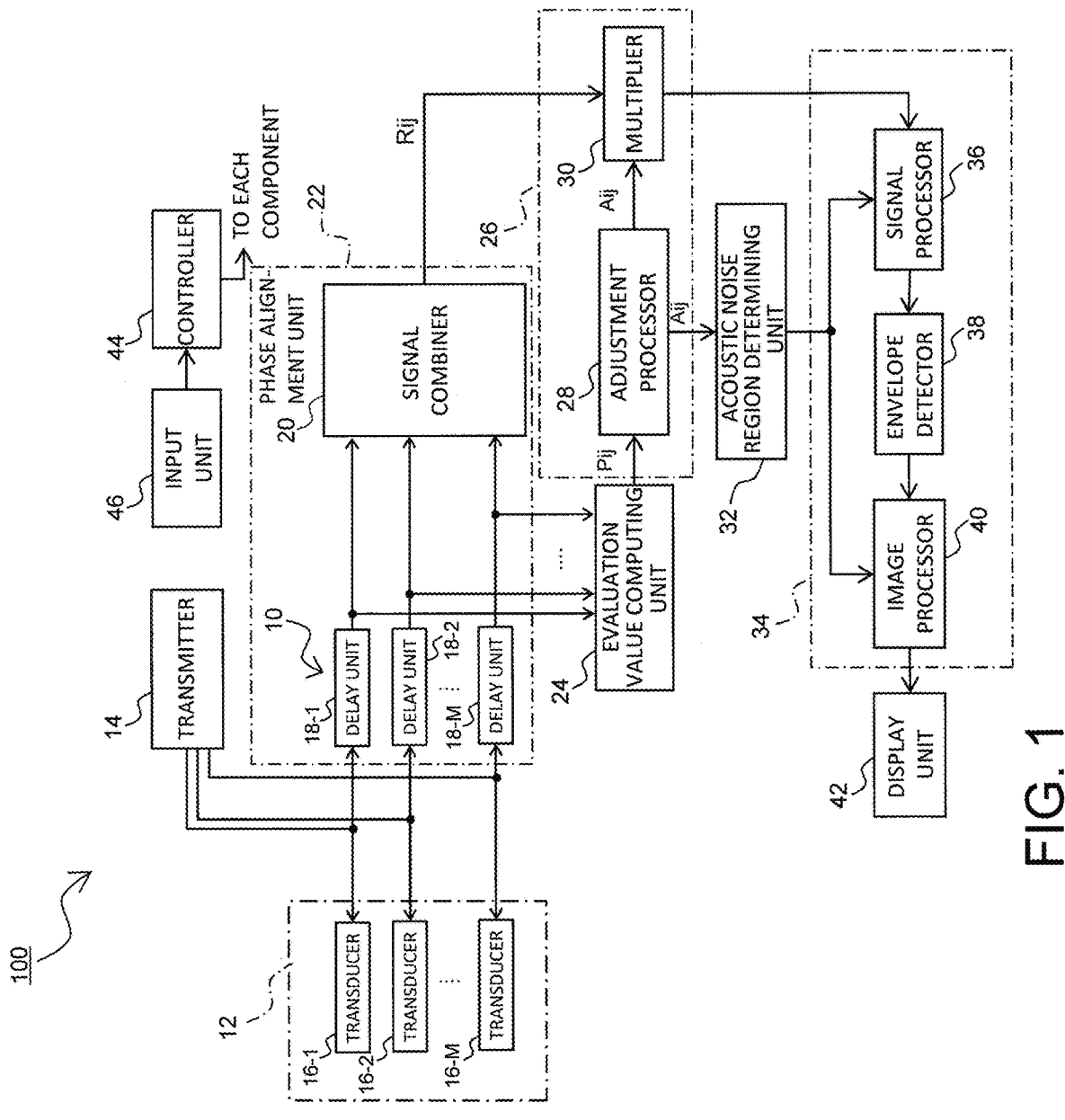
FIG. 1 is a diagram showing components of an ultrasound diagnostic apparatus according to an embodiment of the present disclosure.

FIG. 1 shows an ultrasound diagnostic apparatus 100 according to an embodiment of the present disclosure. The ultrasound diagnostic apparatus 100 includes components for transmitting and receiving ultrasound waves to generate an ultrasound image and display the generated ultrasound image, and such components include an ultrasound probe 12, a transmitter 14, a phase alignment unit 22, an image generator 34, and a display unit 42. The phase alignment unit 22 includes delay units 18-1 to 18-M (where M is a positive integer) and a signal combiner 20. The ultrasound diagnostic apparatus 100 further includes an input unit 46 and a controller 44 configured to control the ultrasound diagnostic apparatus 100 in its entirety. The input unit 46 may include a button, a lever, a keyboard, a mouse, and other components. The input unit 46 may be a touch panel disposed on the display unit 42. The ultrasound diagnostic apparatus 100 further includes an evaluation value computing unit 24, a noise reducing unit 26, and an acoustic noise region determining unit 32. The evaluation value computing unit 24 performs evaluation related to acoustic noise contained in a received ultrasound wave. The noise reducing unit 26 and the acoustic noise region determining unit 32 perform processing related to noise and other defects contained in a displayed image.

Components, such as the delay units 18-1 to 18-M, the signal combiner 20, the evaluation value computing unit 24, the noise reducing unit 26, the acoustic noise region determining unit 32, the image generator 34, and the controller 44, may be embodied by a computation device which implements functions of the components when executing programs. The computation device may be a computer incorporating a CPU, a memory, and an interface, or a programmable device, such as a FPGA (Field Programmable Gate Array), or a processor.

The ultrasound probe 12 includes M transducers 16-1 to 1-M. The transmitter 14 outputs a transmission signal to each of the transducers 16. Each of the transducers 16 converts the transmission signal into an ultrasound wave and transmits the ultrasound wave into a living tissue of an examination subject. The transmitter 14 adjusts a delay time of the transmission signal to be output to each of the transducers 16. This can enhance an ultrasound wave in a specific direction and accordingly form a transmission beam of the ultrasound wave. Further, a focal point onto which ultrasound waves are concentrated is formed on the transmission beam.

The transducers 16-1 to 16-M receive ultrasound waves reflected from the living tissue, convert the received ultrasound waves into reception signals which are electric signals, and output the reception signals to the delay units 18-1 to 18-M, respectively. The phase alignment unit 22 composed of the delay units 18-1 to 18-M and the signal combiner 20 performs phase alignment and addition of the reception signals output from the transducers 16-1 to 16-M to generate a phase-aligned reception signal. Specifically, the delay units 18-1 to 18-M delay the reception signals output from the transducers 16-1 to 16-M and output the delayed reception signals to the signal combiner 20. The signal combiner 20 adds and sums (combines) the reception signals output from the delay units 18-1 to 18-M to generate the phase-aligned reception signal.

When the delay units 18 cause the reception signals to be delayed by delay times which are controlled by the controller 44, the reception signals based on the ultrasound waves received from a specific direction are mutually enhanced, and a phase-aligned reception signal is generated from the mutually enhanced reception signals. In other words, the reception signals output from the transducers 16-1 to 16-M are phase aligned and added to generate the phase-aligned reception signal in such a manner that a reception beam is formed along the specific direction. The controller 44 controls the delay times used in the delay units 18 to match a transmission beam direction with a reception beam direction.

Further, the controller 44 changes delay times of transmission signals and delay times in the delay units 18 so as to enable scanning, within the living tissue, of a transmission beam and a reception beam (hereinafter, collectively referred to as an ultrasound beam) of ultrasound waves which are repeatedly transmitted from and repeatedly received in the transducers 16-1 to 16-M.

In the following explanation, a direction of the ultrasound beam as viewed from the ultrasound probe 12 is represented by an azimuth angel $\theta j$, and a time variable used to represent the phase-aligned reception signal in the form of discrete signals is defined as ti. Angles $\theta 1$ to $\theta N$ (where $\theta 1 < \theta 2 < \ldots < \theta N$) are defined as the azimuth angle $\theta j$ of the ultrasound beam, and the ultrasound beam is sector scanned while repetitively changing the azimuth angles $\theta 1$ to $\theta N$ in a sequence of $\theta 1, \theta 2, \ldots, \theta N, \theta 1, \theta 2, \ldots, \theta N, \theta 1, \theta 2, \ldots$ and so on. Positions t1, t2, $\ldots$, and tK on a time axis of the phase-aligned reception signal obtained for one ultrasound beam correspond to positions within the living tissue in such a manner that a position at a later time on the time axis corresponds to a deeper position within the living tissue. With this in view, the positions t1, t2, $\ldots$, and tK on the time axis on which values of the phase-aligned reception signal are plotted are converted into depths d1, d2, d3, $\ldots$, and dK within the living tissue along the direction of the ultrasound beam, and the depths d1, d2, d3, dK are used in the following explanation.

A noise reducing process to reduce noise is performed by the noise reducing unit 26 on the phase-aligned reception signal generated for each of ultrasound beam directions. The phase-aligned reception signal from which noise is reduced by the noise reducing process (hereinafter, referred to as a noise reduced reception signal) is input into the image generator 34.

The image generator 34 includes a signal processor 36, an envelope detector 38, and an image processor 40. The signal processor 36 performs logarithmic amplification, a band pass filter operation, and other operations of the noise reduced reception signal, and outputs the resulting noise reduced reception signal to the envelope detector 38. The envelope detector 38 detects an envelope of the noise reduced reception signal to generate beam line data for the ultrasound beam. The beam line data indicate each pixel value of a plurality of pixels arranged along a depth direction of the living tissue. The envelope detector 38 generates the beam line data for each of the azimuth angles $\theta 1$ to $\theta N$ of the ultrasound beam. That is, the envelope detector 38 generates N sets of beam line data corresponding to N ultrasound beams, and outputs the N sets of generated data to the image processor 40.

The image processor 40 performs, based on the N sets of beam line data, upsampling or downsampling of the beam line data, a scan conversion of converting coordinates of a depth and azimuth angle $\theta$ coordinate system into pixel coordinates of a vertical and horizontal coordinate system used for displaying an image, and other operations, such as edge enhancements and smoothing, to generate one frame of ultrasound image data. The image processor 40 sequentially generates ultrasound image data at a predetermined frame rate, generates image signals indicative of an ultrasound image, and outputs the generated image signals to the display unit 42. The display unit 42 displays, in response to the image signals, ultrasound images based on the ultrasound image data sequentially generated at the predetermined frame rate.

In the ultrasound diagnostic apparatus 100 according to an embodiment of this disclosure, the delay processor 10, the signal combiner 20, the evaluation value computing unit 24, the noise reducing unit 26, and the image generator 34 constitute an ultrasound image processing apparatus. The delay processor 10 equipped with the delay units 18-1 to 18-M individually delays the reception signals respectively output from the plurality of transducers 16-1 to 16-M mounted on the ultrasound probe 12. The signal combiner 20 adds and sums the delayed reception signals; i.e., combines the delayed reception signals to generate the phase-aligned reception signal.

The evaluation value computing unit 24 determines, based on the delayed reception signals, a noise evaluation value for the phase-aligned reception signal. The noise evaluation value is obtained, as described below, by evaluating acoustic noise contained in the phase-aligned reception signal. The noise reducing unit 26 performs, based on the noise evaluation value, the noise reducing process on the phase-aligned reception signal. The image generator 34 generates ultrasound image data based on the noise reduced reception signal, and causes the display unit 42 to display the ultrasound image based on the ultrasound image data.

The evaluation value computing unit 24 and the noise reducing unit 26 are explained below. The evaluation value computing unit 24 finds a noise evaluation value Pij for each of the reception signals output from the delay units 18-1 to 18-M, based on the coherence factor method or the DAX method, which will be described further below. Here, letters i and j in the noise evaluation value Pij denote that the noise evaluation value Pij is a value of a phase-aligned reception signal obtained at a time ti from an ultrasound beam propagating at an azimuth angle $\theta j$ (a value corresponding to a depth di). The noise evaluation value Pij takes values from 0 to 1, and is decreased as a noise component contained in the value of the phase-aligned reception signal is increased.

The evaluation value computing unit 24 generates the noise evaluation value Pij (where i=1 to K, j=1 to N) based on values of the phase-aligned reception signal corresponding to depths d1 to dK, the values which are respectively generated with respect to the azimuth angles θ1 to θN of an ultrasound beam, and outputs the generated noise evaluation value Pij to an adjustment processor 28. That is, the evaluation value computing unit 24 generates noise evaluation values P11, P12, P13, . . . , P1K, P21, P21, P22, P23, . . . , P2K, P31, P32, . . . PNK, and outputs the noise evaluation values P11 to PNK to the adjustment processor 28. In this way, the noise evaluation value Pij is defined on a d-θ plane taking a position in a depth direction as d and an azimuth angle direction as θ (that is, a two-dimensional coordinate plane on a scanning region where the reception beam is scanned). The noise evaluation value Pij generated for each of combinations of i and j represents a distribution of noise evaluation values (evaluation value distribution) on the d-θ plane.

The noise reducing unit 26 is equipped with the adjustment processor 28 and a multiplier 30. The adjustment processor 28 performs an adjustment process on the noise evaluation value Pij to obtain a weight Aij and outputs the obtained weight Aij to both the multiplier 30 and an acoustic noise region determining unit 32. The adjustment process is designed to improve visibility of an ultrasound image displayed on the display unit 42. The adjustment process includes a smoothing operation to smooth the noise evaluation value Pij on the d-θ plane, and a lower limit operation to set a lower limit value to the weight Aij. The lower limit operation is designed to assign a fixed lower limit value to the weight Aij when the noise evaluation value Pij matches or falls below a predetermined value.

The multiplier 30 performs the noise reducing process in which a value Rij of the phase-aligned reception signal output from the signal combiner 20 is multiplied by the weight Aij, to generate the noise reduced reception signal. Here, the value Rij of the phase-aligned reception signal is associated with the depth di in a direction of the azimuth angle θj. The multiplier 30 outputs the noise reduced reception signal to the image generator 34.

An operation performed by the evaluation value computing unit 24 to find the noise evaluation value Pij is explained below. The evaluation value computing unit 24 finds the noise evaluation value Pij according to following Equation 1 which is based on the coherence factor method, for example.

$$Pij = \frac{\left| \sum_{m=1}^{M} s_{i,j}(m) \right|^2}{M \sum_{m=1}^{M} |s_{i,j}(m)|^2} \qquad \text{[Equation 1]}$$

In Equation 1, $S_{i,j}(m)$ denotes a value of a reception signal corresponding to the depth di in the living tissue, the reception signal being output from a delay unit 18-*m* (where m is an integer from 1 to M) at the azimuth angle θj of an ultrasound beam.

Figure 2:
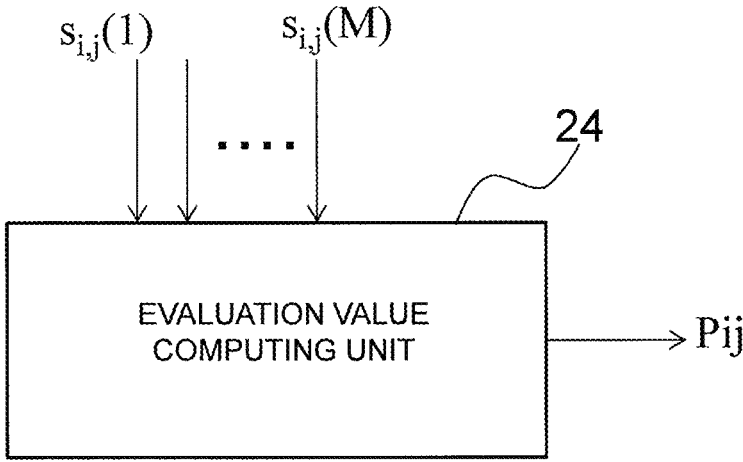
FIG. 2 is a block diagram showing an evaluation value computing unit configured to determine a noise evaluation value based on a coherence factor method.

FIG. 2 shows a block diagram of the evaluation value computing unit 24 which acquires the noise evaluation value Pij based on the coherence factor method. Reception signals $S_{i,j}(1)$ to $S_{i,j}(M)$ are respectively output from the delay units 18-1 to 18-M to the evaluation value computing unit 24. The evaluation value computing unit 24 outputs the noise evaluation value Pij acquired by Equation 1.

The noise evaluation value Pij acquired by Equation 1 becomes smaller as a phase aberration exerted on the ultrasound wave propagating through the living tissue becomes greater. The phase aberration denotes a phenomenon in which nonuniform propagation characteristics of ultrasound waves propagating through a living tissue cause variations in amounts of phase rotation of the ultrasound waves propagating the same distance. Further, the noise evaluation value Pij acquired by Equation 1 also becomes smaller as a side lobe component contained in the reception signal $S_{i,j}(m)$ becomes greater. When the value Rij of the phase-aligned reception signal is multiplied by the noise evaluation value Pij, or multiplied by the weight Aij which is determined by applying the below-described adjustment process to the noise evaluation value Pij, noise is reduced, the noise being included in the phase-aligned reception signal due to the phase aberration and the side lobe.

The operation to acquire the noise evaluation value Pij based on the coherence factor method includes, in addition to the operation expressed by Equation 1, a PCF (Phase Coherence Factor) method of obtaining the noise evaluation value Pij using a standard deviation of phases of the reception signals $S_{i,j}(1)$ to $S_{i,j}(M)$, and a GCF (Generalized Coherence Factor) method of calculating Fourier spectra in a direction of an axis m of the reception signals $S_{i,j}(1)$ to $S_{i,j}(M)$ and using a ratio of energy, in a low frequency band in proximity to a frequency of 0, of the Fourier spectra to the entire energy of the Fourier spectra (Patent Document 1), for example. All of the operations based on the coherence factor method yield an evaluation value which is decreased as the variation in the phase aberration within the living tissue functioning as a propagation medium becomes greater. For this reason, the evaluation value becomes smaller as an amount of contained side lobe component is increased, or as a sound velocity distribution of the ultrasound wave is more greatly varied in a medium through which the ultrasound wave propagates. In addition, a small evaluation value tends to be found for a reception signal indicative of an artifact resulting from multipath reflection of the ultrasound wave being repetitively reflected from a probe surface and a plurality of structures having a high reflection intensity.

The evaluation value computing unit 24 may be configured to acquire the noise evaluation value Pij using Equation 2 based on the DAX (Dual Apodization with Cross-Correlation) method as follows:

$$Pij = \frac{\sum_{k=i-b}^{i+b} Y1(k, j)Y2(k, j)}{\sqrt{\sum_{k=i-b}^{i+b} Y1(k, j)^2} \sqrt{\sum_{k=i-b}^{i+b} Y2(k, j)^2}} \qquad \text{[Equation 2]}$$

In Equation 2, Y1(kj) and Y2(k,j) represent channel sum signals which are obtained by following Equations 3 and 4, respectively.

$$Y1(k, j) = \sum_{m=1}^{M} A1_{i,j}(m)s_{i,j}(m) \qquad \text{[Equation 3]}$$

$$Y2(k, j) = \sum_{m=1}^{M} A2_{i,j}(m)s_{i,j}(m) \qquad \text{[Equation 4]}$$

A first reception aperture function A1i,j(m) and a second reception aperture function A2i,j(m) correspond to the two reception aperture functions of the DAX method. Equation 3 denotes that the channel sum signal Y1(k,j) is acquired by performing, on each of the delayed reception signals, a first weighted sum operation based on the first reception aperture function $A1i,j(m)$. Equation 4 denotes that the channel sum signal $Y2(k,j)$ is acquired by performing, on each of the delayed reception signals, a second weighted sum operation based on the second reception aperture function $A2i,j(m)$. Equation 2 denotes that the noise evaluation value Pij is obtained based on a cross-correlation operation to find cross correlation between the channel sum signal $Y1(k,j)$ acquired by the first weighted sum operation and the channel sum signal $Y2(k,j)$ acquired by the second weighted sum operation.

FIGS. 3A to 3D show examples of the first reception aperture function $A1_{i,j}(m)$ and the second reception aperture function $A2_{i,j}(m)$. The horizontal axis represents a sequence number (channel number) m of the transducer 16, and the vertical axis represents a value of the aperture function. FIGS. 3A to 3D show examples of the first reception aperture function $A1_{i,j}(m)$ and the second reception aperture function $A2_{i,j}(m)$ for sixty-four transducers 16-1 to 16-64. Crosshatched regions are regions of m with respect for which the reception aperture function yields a value of 1, and non-crosshatched regions are regions of m with respect for which the reception aperture function yields a value of 0.

Figure 3A:
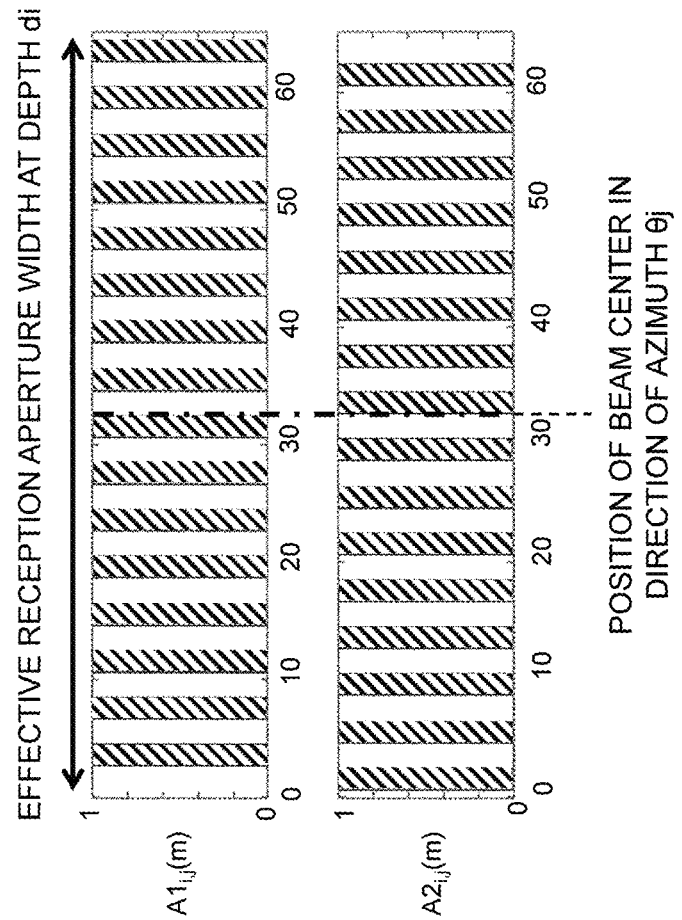
FIG. 3A shows an example of a first reception aperture function and a second reception aperture function.
Figure 3B:
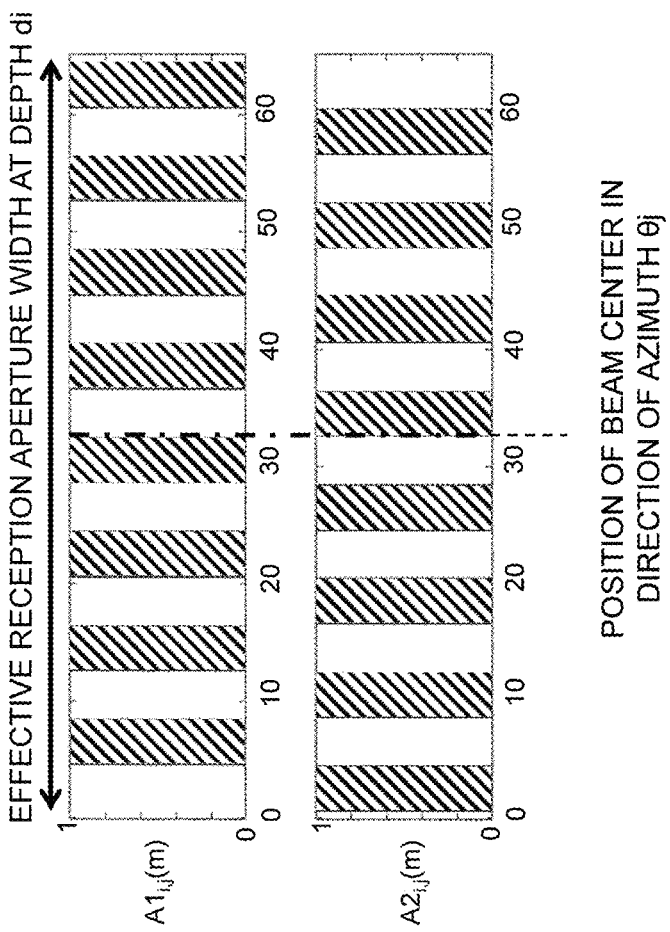
FIG. 3B shows another example of the first reception aperture function and the second reception aperture function.
Figure 3C:
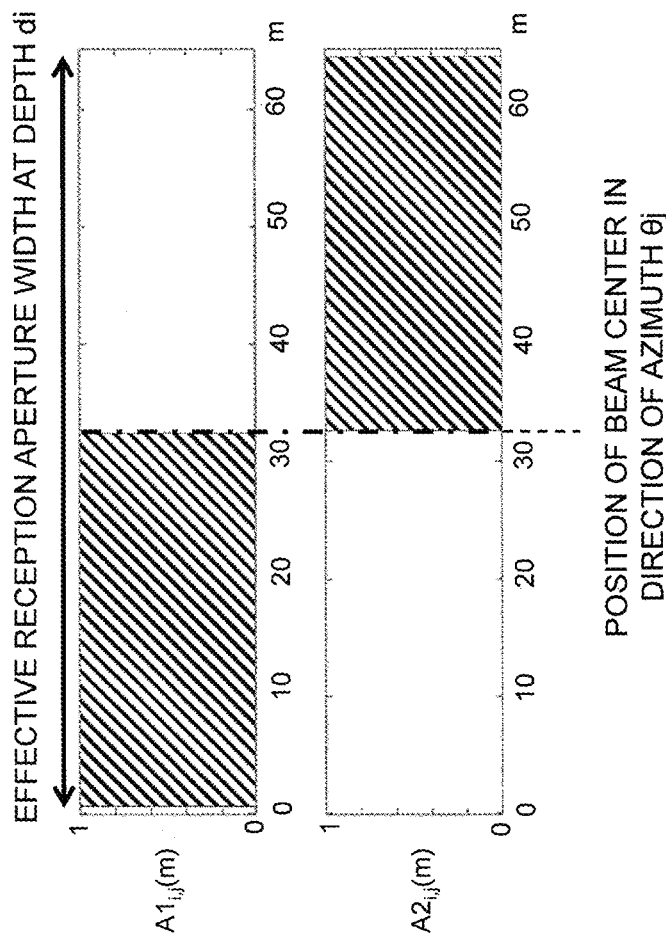
FIG. 3C shows a further example of the first reception aperture function and the second reception aperture function.
Figure 3D:
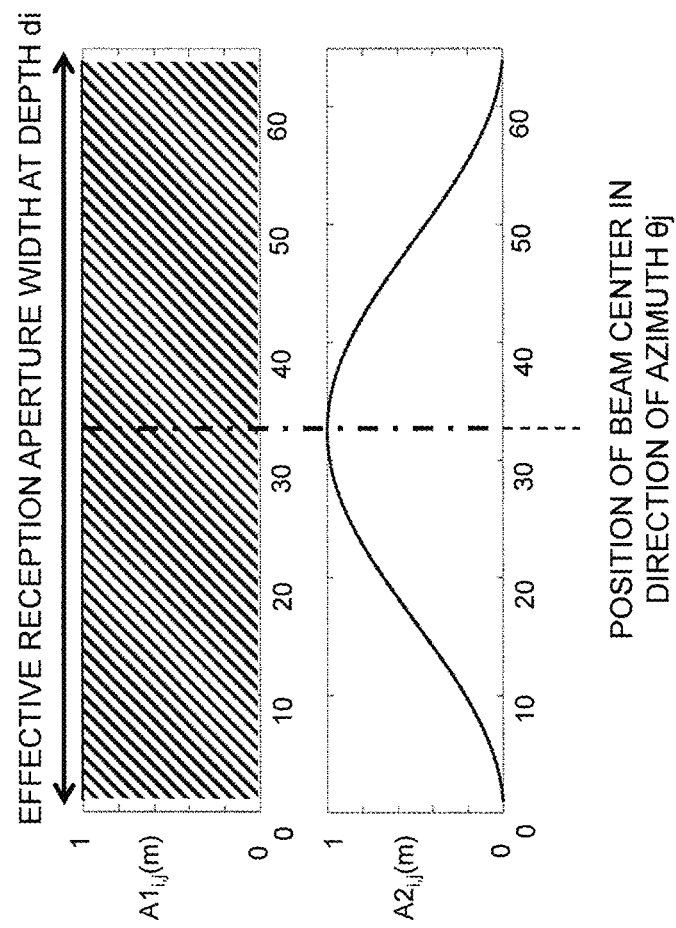
FIG. 3D shows another example of the first reception aperture function and the second reception aperture function.
Figure 3E:
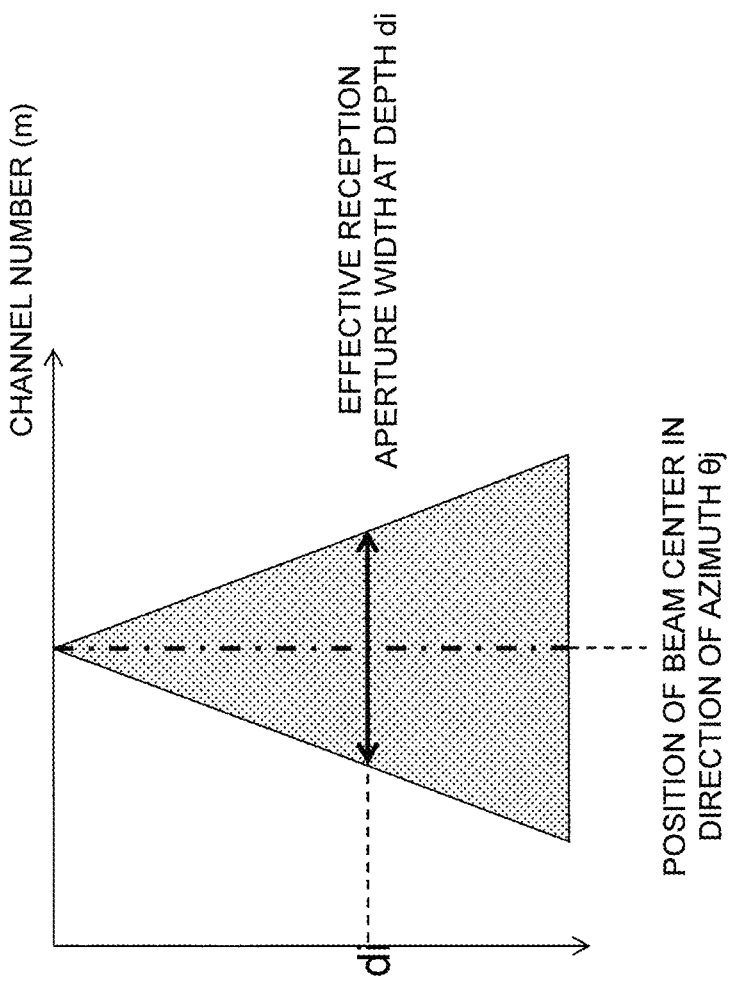
FIG. 3E shows an example of an aperture center and an aperture width of the first reception aperture function and the second reception aperture function.

FIG. 3E shows an example of a location of the channel number corresponding to a beam center in the direction of the azimuth angle θj shown in FIGS. 3A to 3D and an effective reception aperture width at the depth di. In general, the reception aperture width is defined to be wider as the depth di is increased. The first reception aperture function $A1_{i,j}(m)$ and the second reception aperture function $A2_{i,j}(m)$ illustrated in FIGS. 3A and 3D are setting values defined for each of combinations of the direction of the azimuth angle θj and the depth di of a beam.

In the examples shown in FIGS. 3A and 3B, the first and second reception aperture functions $A1_{i,j}(m)$ and $A2_{i,j}(m)$ have a periodic pattern of values of 1 and 0 which are repeated in L steps where L is an integer. In a case of L=2, the first and second reception aperture functions $A1_{i,j}(m)$ and $A2_{i,j}(m)$ have a pattern of 1, 1, 0, 0, 1, 1, 0, 0, . . . , for example. In addition, the first reception aperture function $A1_{i,j}(m)$ and the second reception aperture function $A2_{i,j}(m)$ are complementary with each other. Specifically, in a range of m where the first reception aperture function $A1_{i,j}(m)$ yields 1, the second reception aperture function $A2_{i,j}(m)$ yields 0, and in a range of m where the first reception aperture function $A1_{i,j}(m)$ yields 0, the second reception aperture function $A2_{i,j}(m)$ yields 1.

The first reception aperture function $A1_{i,j}(m)$ and the second reception aperture function $A2_{i,j}(m)$ shown in FIG. 3C are symmetric with respect to the center of a reception aperture.

The first reception aperture function $A1_{i,j}(m)$ shown in FIG. 3D is a flat function with a weight being 1 for all effective reception aperture widths, and the second reception aperture function $A2_{i,j}(m)$ shown in FIG. 3D is represented by a window function, such as a Hanning window function or a Hamming window function, with a weight being decreased outward from the center of the effective reception aperture width.

Equation 2 indicates that the noise evaluation value Pij is acquired by a normalized cross correlation operation of the channel sum signals $Y1(k,j)$ and $Y2(k,j)$. A cross correlation value with respect to the depth di in the direction of the azimuth angle θj is acquired in a range of 2b+1 i.e., from the depth di−b to the depth di+b in the direction of the azimuth angle θj. The cross correlation value is indicative of a degree of similarity (approximation degree) between the channel sum signals $Y1(k,j)$ and $Y2(k,j)$. A range equivalent to a length of approximately several wavelengths of the ultrasound wave is defined as the above-described range of 2b+1 in a direction of the depth di in which the cross correlation value is calculated. Other than the cross correlation using such a one-dimensional range in the direction of the depth di indicated in Equation 2, a two-dimensional range composed of a range of 2e+1 from a position at the azimuth angle θj and the range of 2b+1 from the position at the depth di may be similarly used to find the cross correlation.

Figure 4:
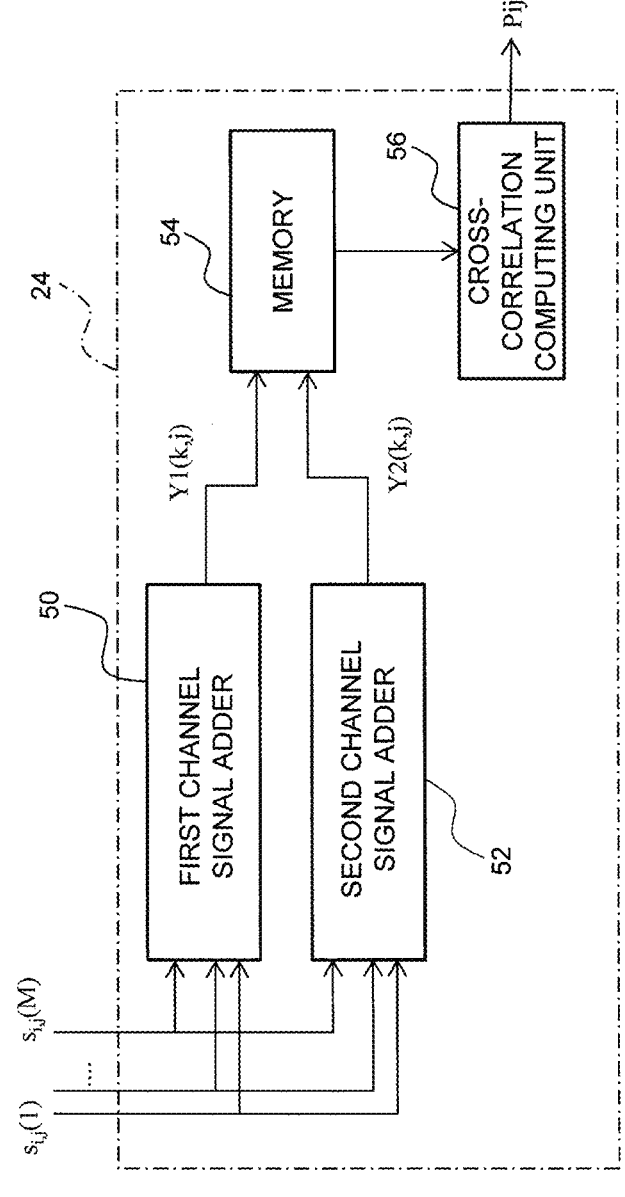
FIG. 4 is a block diagram showing an evaluation value computing unit configured to determine a noise evaluation value based on a DAX method.

FIG. 4 shows a block diagram of the evaluation value computing unit 24 configured to acquire the noise evaluation value Pij based on the DAX method. The evaluation value computing unit 24 includes a first channel signal adder 50, a second channel signal adder 52, a memory 54, and a cross-correlation computing unit 56. The delay units 18-1 to 18-M respectively output reception signals $S_{i,j}(1)$ to $S_{i,j}(M)$ to both the first channel signal adder and the second channel signal adder 52.

The first channel signal adder 50 acquires the channel sum signal $Y1(k,j)$ for each of values of k ranging from 1 to K according to Equation 3 and stores the acquired channel sum signal $Y1(kj)$ in the memory 54. The second channel signal adder 54 acquires the channel sum signal $Y2(k,j)$ for each of values of k ranging from 1 to K according to Equation 4 and stores the acquired channel sum signal $Y2(k,j)$ in the memory 54. The memory 54 stores channel sum signals $Y1(1,j)$ to Y1 (Kj) and the channel sum signals $Y2(1j)$ to Y2(K,j). The cross-correlation computing unit 56 acquires the noise evaluation value Pij according to Equation 2 with reference to the channel sum signals $Y1(1j)$ to $Y1(Kj)$ and the channel sum signals $Y2(1,j)$ to Y2(K,j) stored in the memory 54.

It has been confirmed by a simulation that the cross-correlation value indicative of the approximation degree between the channel sum signal $Y1(kj)$ and the channel sum signal $Y2(k,j)$ can represent an appropriate noise evaluation value Pij when the first reception aperture function Alij(m) and the second reception aperture function $A2i,j(m)$ have a particular relationship with each other as shown in FIGS. 3A to 3D. That is, as noise contained in the value Rij of the phase-aligned reception signal corresponding to the depth di in the direction of the azimuth angle θj becomes greater, the noise evaluation value Pij becomes smaller. The supposed reason for this is nonuniformity in phases of noise received in the transducers 16-1 to 16-M, and a discrepancy between signal intensity distribution characteristics of noise in a direction of an array of the transducers 16-1 to 16-M and of a signal which should be observed in that direction.

For example, when the reception aperture functions illustrated in FIGS. 3A and 3B are used, a grating lobe is formed due to periodic patterns of the reception aperture functions. For an echo signal received along a direction of the grating lobe, the noise evaluation value Pij takes a low value of −1, because the channel sum signal $Y1(k,j)$ and the channel sum signal $Y2(k,j)$ calculated for the echo signal are shifted in phase by a ½ period, and signs of amplitudes of the signals $Y1(k,j)$ and $Y2(k,j)$ are inverted. Here, a signal which should be observed exhibits a high sensitivity in the direction of the azimuth angle θj, while noise having nonuniform phases may be considered a signal of mixed plane waves propagating at an angle different from the direction of the azimuth angle θj. Therefore, in contrast to the signal which should be observed, the noise includes, at a higher ratio, plane wave components associated with the direction of the grating lobe, which makes the evaluation value Pij small. Further, the signal intensity distribution characteristic of the signal which should be observed in the direction of the transducer array is right-left symmetric with respect to a position of the beam center in the direction θj, whereas the signal intensity distribution characteristic of the noise, such as the side lobe, tends to be right-left asymmetric. For this reason, when the reception aperture functions which are laterally inverted with respect to the position of the beam center in the direction θj are used, the noise evaluation value Pij is decreased as a component of noise in the value Rij of the phase-aligned reception signal is increased. Moreover, in connection with the flat first reception aperture function $A1_{i,j}(m)$ illustrated in FIG. 3D, it has been known that, in general, a greater amount of the side lobe component is received as compared to a case where the second reception aperture function A2ij(m), such as the Hamming window function, is used. For this reason, the noise evaluation value Pij obtained using the first reception aperture function $A1_{i,j}(m)$ is decreased as the component of noise, in particular, the side lobe component in the value Rij of the phase-aligned reception signal, is increased.

Next, an operation performed by the adjustment processor 28 to find the weight Aij for the noise evaluation value Pij through the adjustment process will be explained. The adjustment processor 28 performs a smoothing operation to smooth a distribution of noise evaluation values Pij in the d-θ plane. For the smoothing operation, a median filter, mathematical morphology, and other operations may be used. An example of performing a morphological operation is explained below. The morphological operation includes at least one of dilation and erosion which are described below. For such operations, a structuring element and a function referred to as a structure function are utilized to determine a distribution value of a noise evaluation value being a processing target, using distribution values of noise evaluation values located around the processing target.

Dilation (an expanding operation) is designed to smooth the noise evaluation values Pij in the d-θ plane using a dilation operation indicated in Equation 5. The dilation operation increases values in a distribution of noise evaluation values P(x), which, in an instance of binary composed of values of 0 and 1, expands a range of values other than 0 in the d-θ plane.

$$DP(x) = \max_{x-u \in F, u \in G} \{P(x-u) + g(u)\} \qquad \text{[Equation 5]}$$

The right side of Equation 5 denotes that the distribution of the noise evaluation values P(x) is shifted on the d-θ plane by an independent variable u in a structure function g(u), and a maximum value is found among values of the shifted distribution added by the structure function g(u). A range of finding the maximum value lies in both a range of a domain G of the structure function g(u) and a range of a domain F of the noise evaluation values P(x-u). That is, the inside of the brace on the right side of Equation 5 denotes finding the maximum value in a case where values of the independent variable u are changed in the range of the domain G of the structure function g(u) and in the range of the domain F of the noise evaluation values P(x-u).

The variables x and u may be two-dimensional coordinate values on the d-θ plane; i.e., the scanning region. Further, the variables x and u may be discrete values (di, θj) in the d-θ plane. The structure function g(u) may be a function defined using two-dimensional coordinates on the scanning region. The structure function g(u) may be defined to take a value other than 0 (for example, a value 1) with respect to the variable u in a range where it is assumed that the structuring element exists and to take the value 0 with respect to the variable u in a range where it is assumed that no structuring element exists. Values of the structure function g(u) may have a gradient of decreasing outward from the center of the structuring element, or may be a fixed value in a range where the structuring element exists. The size of the structuring element may be defined to be approximately equal to the size of speckle noise. A plurality of structuring elements may be arranged at an interval of approximately one wavelength of the ultrasound wave in the depth direction and at an interval of approximately two or three wavelengths of the ultrasound wave in the scanning direction of ultrasound beams.

Erosion (a reducing operation) is designed to smooth the noise evaluation values Pij in the d-θ plane using an erosion operation indicated in Equation 6. The erosion operation decreases values in the distribution of the noise evaluation values P(x), which, in the instance of binary composed of 0 and 1, minimizes the range of values other than 0 in the d-θ plane.

$$EP(x) = \min_{x-u \in F, u \in G} \{P(x-u) - g(u)\} \qquad \text{[Equation 6]}$$

The right side of Equation 6 denotes that the distribution of the noise evaluation values P(x) is shifted on the d-θ plane by the independent valuable u in the structure function g(u), and a minimum value is found among values of the shifted distribution from which the structure function g(u) is subtracted. A range of finding the minimum value lies in both the range of the domain G of the structure function g(u) and the domain F of the noise evaluation values P(x-u). That is, the inside of the braces on the right side of Equation 6 denotes finding the minimum value in the case where values of the independent variable u are changed in the range of the domain G of the structure function g(u) and in the range of the domain F of the noise evaluation values P(x-u).

The adjustment processor 28 may be configured to apply, to the noise evaluation value Pij, a closing operation in which dilation is initially performed and erosion is subsequently performed. Further, the adjustment processor 28 may be configured to apply, to the noise evaluation value Pij, the opening operation in which erosion is initially performed and dilation is subsequently performed.

Figure 5:
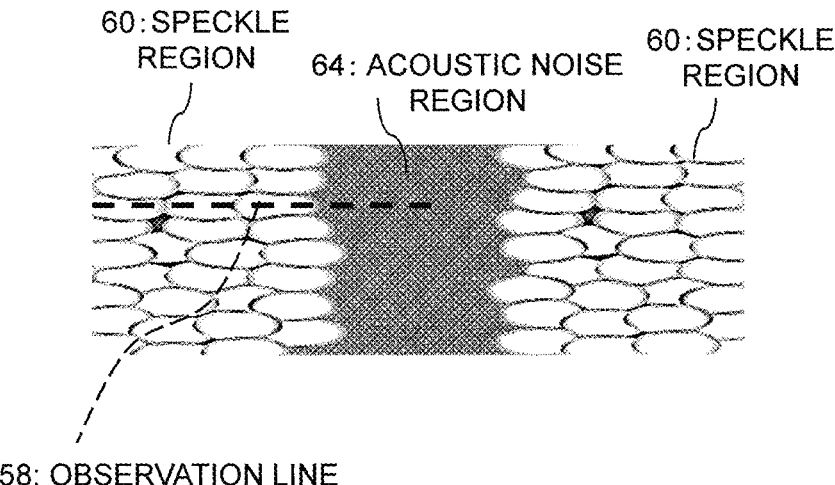
FIG. 5 is a diagram schematically showing an ultrasound image displayed on a display unit.
Figures 6A, 6B:
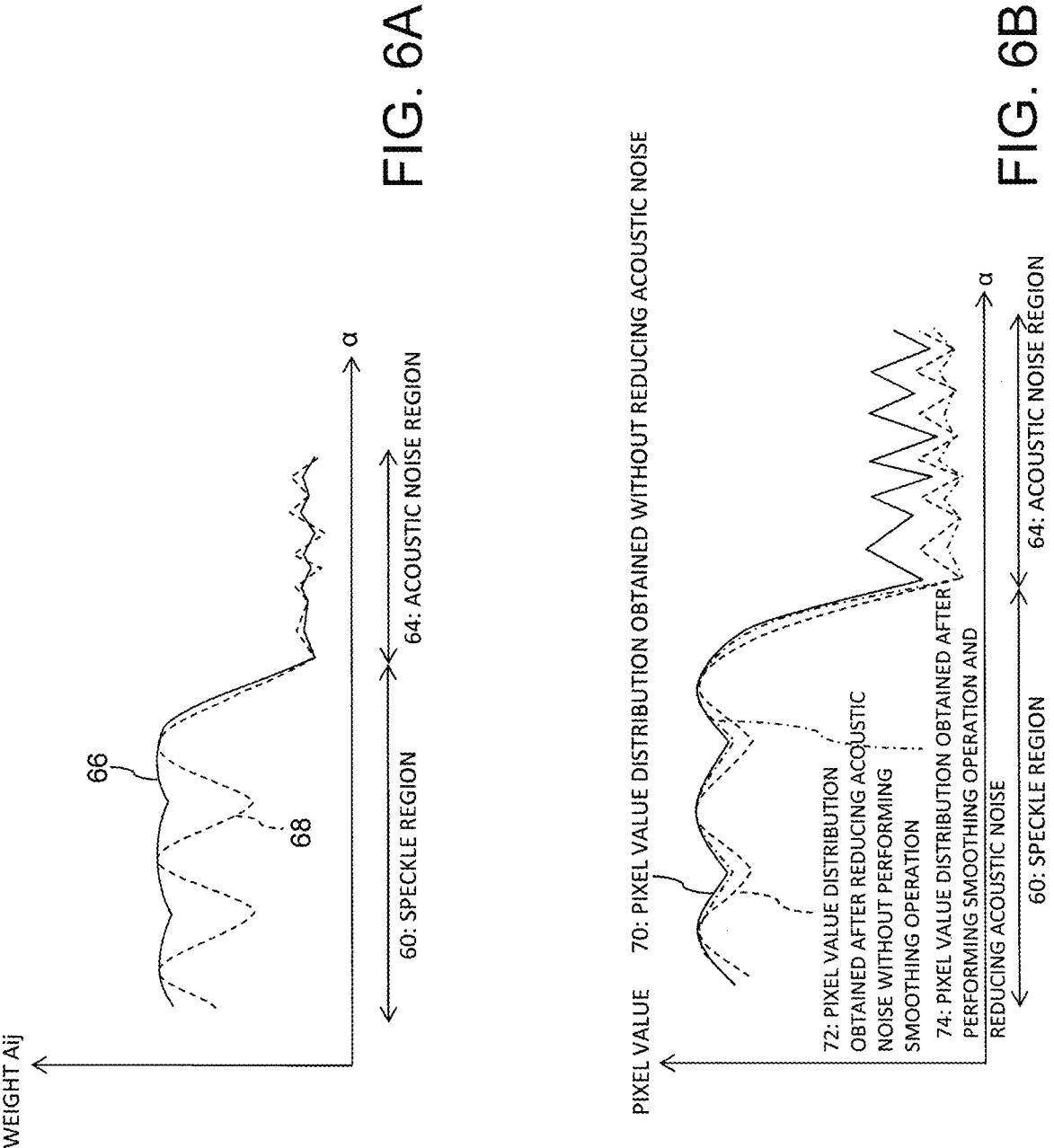
FIG. 6A is a diagram schematically showing weights acquired on an observation line indicated in FIG. 5.
FIG. 6B is a diagram schematically showing a pixel value distribution.

FIG. 5 schematically shows an ultrasound image to be displayed on the display unit 42. FIG. 5 shows right and left speckle regions 60 where speckle noise is present, and an acoustic noise region 64 (echo absent region) sandwiched between the right and left speckle regions 60. FIG. 6A schematically shows the weight Aij obtained on an observation line 58 indicated in FIG. 5. The horizontal axis in FIG. 6A is an axis α corresponding to the observation line 58, and the vertical axis represents the weight Aij. Values of the weight Aij obtained by performing, as the smoothing operation, the morphological operation on the noise evaluation value Pij are indicated by a distribution 66. Further, values of the weight Aij obtained from the noise evaluation value Pij without performing any smoothing operation are indicated by a distribution 68. As can be seen from FIG. 6A, in the speckle region 60, variations of the weight Aij viewed in a direction of the axis α are suppressed by performing the smoothing operation. As a result, the effect of suppressing speckle noise is improved.

FIG. 6B schematically shows a pixel value distribution 70 obtained in a case where the noise reducing process to reduce acoustic noise is not performed, and pixel value distributions 72 and 74 obtained in a case where the noise reducing process to reduce acoustic noise is performed. The pixel value distribution 72 indicates pixel values obtained using the noise evaluation value Pij to which no smoothing operation is applied; i.e., pixel values obtained by reducing the acoustic noise without performing the smoothing operation. The pixel value distribution 74 indicates pixel values obtained using the weight Aij acquired by performing the smoothing operation; i.e., pixel values obtained by performing the smoothing operation and reducing the acoustic noise.

In the pixel value distribution 72 obtained by reducing acoustic noise without performing the smoothing operation, acoustic noise in the acoustic noise region 64 is reduced as compared to that in the pixel value distribution 70 obtained in a case where acoustic noise is not reduced. However, in the pixel value distribution 72, when viewed in the direction of the axis α, the pixel values are greatly varied in the speckle region 60, and speckle noise is increased to be greater than that in the pixel value distribution 70 obtained in the case where acoustic noise is not reduced. Here, a size of speckle noise may be measured using, as an index, a standard deviation in a pixel value distribution obtained in a speckle region, for example, and a greater size of speckle noise may denote a greater variation of pixel values.

In the pixel value distribution 74 obtained by performing the smoothing operation in addition to reducing acoustic noise, acoustic noise is reduced to be smaller in the acoustic noise region 64 than that in the pixel value distribution 70 obtained in the case where acoustic noise is not reduced. In addition, in the pixel value distribution 74, when viewed in the direction of the axis α, the variation of pixel values is suppressed as compared to that in the pixel value distribution 72 obtained by reducing the acoustic noise without performing the smoothing operation. As such, visibility of the living tissue shown in a displayed image can be improved by performing the smoothing operation in addition to reducing the acoustic noise.

The adjustment processor 28 is configured to perform weighting value conversion to find a value of the weight Aij for a noise evaluation value Pij which is acquired by performing processing based on the coherence factor method or the DAX method and subsequently performing the morphological operation. In the weighting value conversion, values of the weight Aij are acquired by a conversion function for associating the noise evaluation value Pij with the weight Aij which takes values in a range from 0 to 1. Alternatively, the adjustment processor 28 may be configured to perform weighting value conversion to find a value of the weight Aij for a noise evaluation value Pij which is acquired by performing processing based on the coherence factor method or the MAX method but performing no morphological operation.

Figure 7:
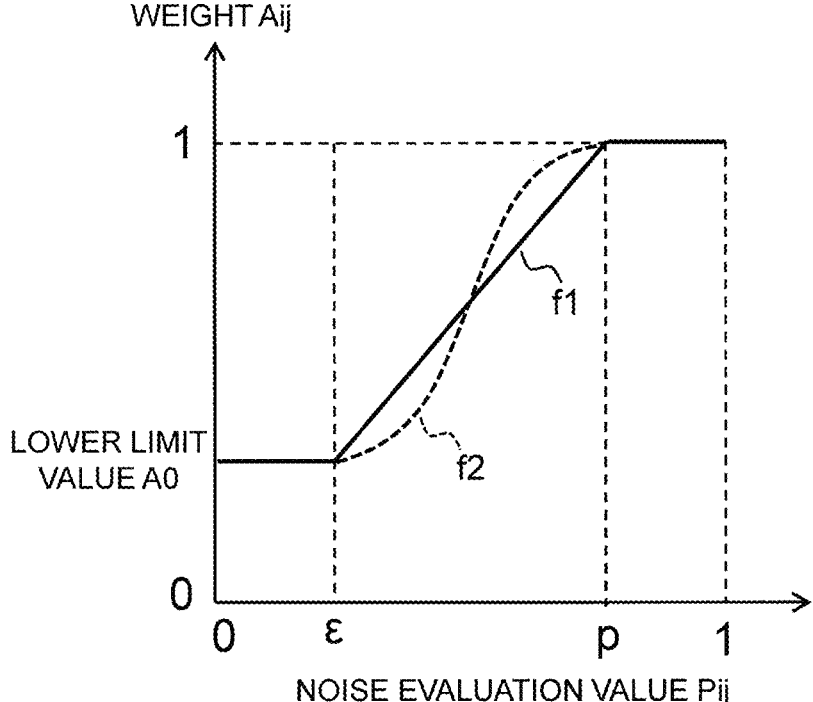
FIG. 7 shows a first example of a conversion function.

The conversion function may be a linear function or a non-linear function and may have a lower limit value of the weight Aij. FIG. 7 shows a first example of the conversion function for associating the noise evaluation value Pij with the weight Aij. A lower limit value A0 is set to the weight Aij, and when the noise evaluation value Pij is in a range from a value ε to a value 0, the weight Aij is assigned the lower limit value A0. It can be prevented by setting the lower limit value A0 to the weight Aij that a portion to be observed disappears from the ultrasound image even when the phase-aligned reception signal contains a great amount of acoustic noise. In addition, a threshold p shown in FIG. 7 may be defined in the conversion function in such a manner that the weight Aij takes a value of 1 with respect to the noise evaluation value Pij in a range from the threshold p to a value 1. Setting the threshold p can prevent excessive reduction in signal intensity of the signal to be observed, regardless of whether the signal to be observed contains acoustic noise. When a conversion function f1 shown in FIG. 7 is used, the weight Aij is linearly increased with respect to the noise evaluation value Pij lying in a range from the value c to the threshold p. Alternatively, the weight Aij may be defined to be non-linearly increased with respect to the noise evaluation value Pij as indicated by a conversion function f2 in FIG. 7.

Figure 8A:
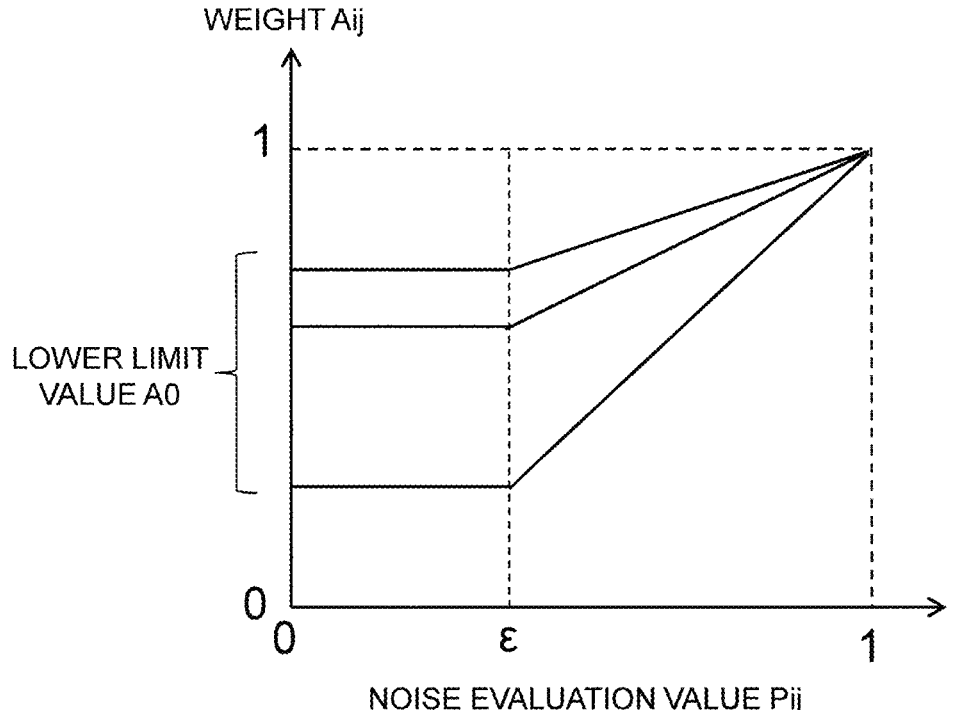
FIG. 8A shows a second example of the conversion function.

FIG. 8A shows a second example of the conversion function for associating the noise evaluation value Pij with the weight Aij. In the second example of the conversion function, one conversion function is selected by specifying a depth di of a processing target. For example, such one conversion function is selected, by specifying the depth di of the processing target, from among a plurality of candidate functions having different lower limit values A0 illustrated in FIG. 7.

Figure 8B:
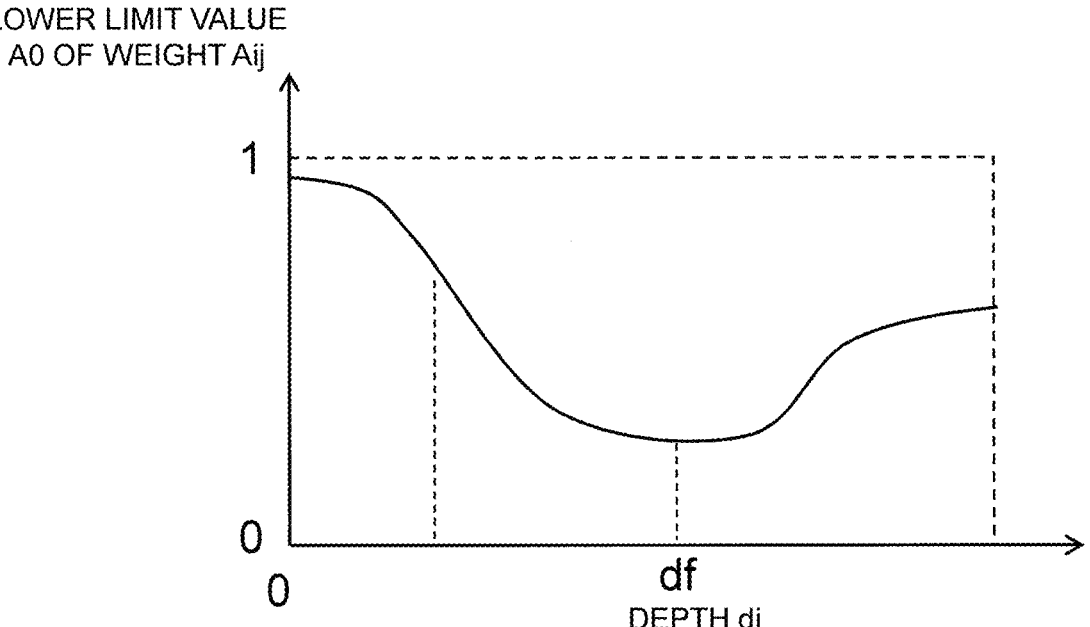
FIG. 8B shows an example of a relationship between a depth di and a lower limit value A0.

FIG. 8B shows an example relationship between the depth di and the lower limit value A0. The lower limit value A0 is defined to become a minimum at a focal depth df where a focal point of the ultrasound beam is formed, and is increased as the depth di is increased from the focal depth df, while in a range of the depth di smaller than the focal depth df, the lower limit value A0 is decreased as the depth di is increased until the depth di reaches the focal depth df.

The adjustment processor 28 acquires the lower limit value A0 corresponding to the depth di of the processing target, based on the relationship shown in FIG. 8B, and finds a value of the weight Aij based on a conversion function identified by the acquired lower limit value A0 from among the plurality of conversion functions shown in FIG. 8A.

The noise evaluation value Pij tends to become smaller in a region distant from the focal depth df. A possible reason for this is that a greater number of echoes from a reflector located far from a beam center axis at the azimuth angle θj are mixedly received as noise due to a thick beam width of the transmission beam in the region distant from the focal depth df. Another possible reason is that in the region deeper than the focal depth df, the ultrasound wave is attenuated during the process of being reflected from the living tissue and received by the ultrasound probe 12, resulting in an increased ratio of random electrical noise in the reception signal. On the other hand, in a region shallower than the focal depth df that is generally referred to as a near sound field, because a phase difference on a wave surface of the transmission beam is great, and an intensity of a diffracted wave at the transmission aperture is also great, phase variations in the reception signal tend to become great.

In a case where the lower limit value which is varied depending on the depth di is not defined for the noise evaluation value Pij, the noise evaluation values Pij calculated for necessary phase-aligned reception signals may be, in some cases, generally decreased in the region distant from the focal depth df, resulting in deteriorated visibility of the living tissue to be observed. The weighting value conversion using the lower limit value which is varied depending on the depth di can improve visibility of the living tissue to be observed, even in the region distant from the focal depth df.

Next, a region determining process performed by the acoustic noise region determining unit 32 is described. In the following explanation, a position represented by coordinate values (di, θj) on the d-θ plane is simply referred to as a position (di, θj). The acoustic noise region determining unit 32 determines, based on the weight Aij acquired for each position (di, θj) on the d-θ plane by the adjustment processor 28, whether the position (di, θj) belongs to an acoustic noise region or belongs to a structure region which is not an acoustic noise region. In other words, the acoustic noise determining unit 32 determines, based on a weighting value distribution acquired at two-dimensional coordinates on the scanning region where the reception beam is scanned, whether the position (di, θj) belongs to the acoustic noise region or the structure region.

The acoustic noise determining unit 32 determines that the position (di, θj) belongs to the acoustic noise region when a value of the weight Aij output from the adjustment processor 28 is smaller than or equal to a given determination threshold Th. On the other hand, the acoustic noise region determining unit 32 determines that the position (di, θj) belongs to the structure region when the value of the weight Aij output from the adjustment processor 28 is greater than the given determination threshold Th. The determination threshold Th may be set as a fixed value smaller than 1 and greater than an average value of the weight Aij calculated for speckle noise. The acoustic noise region determining unit 32 outputs region determination information indicating a result of determination as to whether the position (di, θj) belongs to the acoustic noise region or the structure region, to both the signal processor 30 and the image processor 40.

The region determination information may be represented as binarized information. Specifically, the region determination information may be represented as (di, θj, Q) where Q is a region identifier which takes a value of 0 to indicate that the position (di, θj) is in the acoustic noise region and takes a value of 1 to indicate that the position (di, θj) is in the structure region. The region determination information (di, θj, Q) is information in which the position (di, θj) is associated with the region identifier Q.

In this case, the acoustic noise region determining unit 32 generates a value (di, θj, 1) of the region determination information for the position (di, θj) and outputs the generated value (di, θj, 1) to both the signal processor 36 and the image processor 40 when the value of the weight Aij output from the adjustment processor 28 exceeds the determination threshold Th. When the value of the weight Aij output from the adjustment processor 28 matches or lies below the determination threshold Th, the acoustic noise region determining unit 32 generates a value (di, θj, 0) of the region determination information for the position (di, θj) and outputs the generated value (di, θj, 0) to both the signal processor 36 and the image processor 40.

The acoustic noise region determining unit 32 may apply the closing operation in the d-θ plane to a binary noise distribution Q=B(di, θj) in which the region identifier Q is obtained by giving the position (di, θj). In this case, the acoustic noise region determining unit 32 outputs to the signal processor 36 and the image processor 40 a value (di, θj, Q˜) of the region determination information including the region identifier Q˜ acquired by applying the closing operation. Application of the closing operation can increase a possibility that a structure in which values of the weight Aij greatly vary depending on the position (di, θj), such as, for example, an aggregate structure of weak scatterers having large speckle noise, can be determined as a structure region.

In the above-described process, whether the position (di, θj) belongs to the acoustic noise region or the structure region is determined based on the weight Aij. This determination may be conducted based on the noise evaluation value Pij output from the evaluation value computing unit 24.

Figure 9:
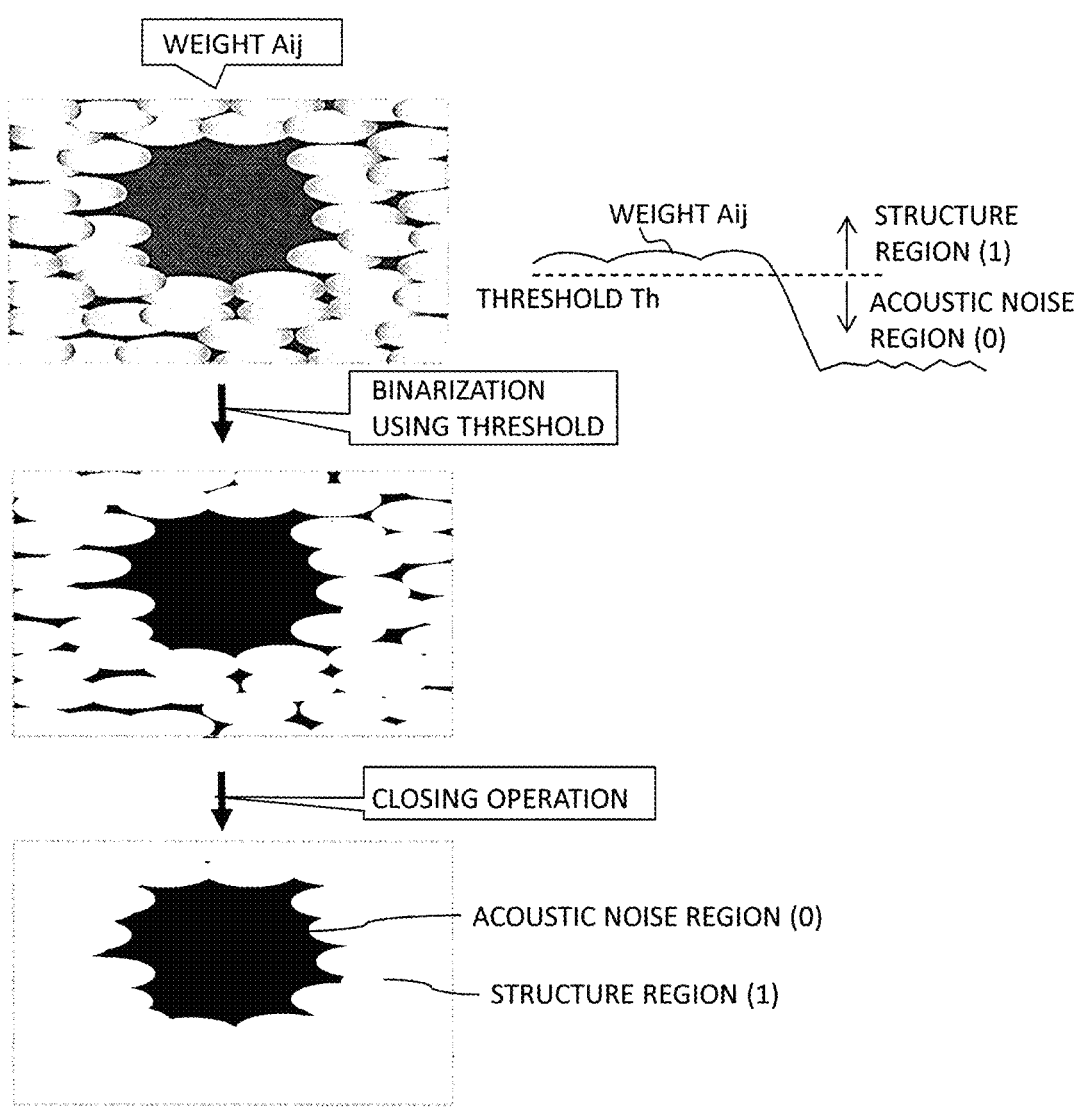
FIG. 9 is a diagram for explaining binarization and a closing operation applied to a distribution of weights.

FIG. 9 schematically shows, in an upper left part, the weight Aij in an image. In an upper right part of FIG. 9, the weight Aij is shown on the axis α representing the observation line 58 similar to that shown in FIG. 5. In a middle part of FIG. 9, the binary noise distribution Q=B (di, θj) is represented by an image in which black regions correspond to an acoustic noise region where the value of 0 is given by binarization, and white regions correspond to a structure region where the value of 1 is given by binarization.

A lower part of FIG. 9 shows a binary noise distribution obtained by applying the closing operation to the binary noise distribution Q=B (di, θj). As a result of the closing operation, the acoustic noise region is reduced, while the structure region is expanded.

In the bad pass filtering operation (band pass filter) performed by the signal processor 36, a filter characteristic of the band pass filter in the direction di is determined based on a frequency band width used by the transducer 16, a non-linear characteristic within the living tissue, an attenuation characteristic within the living tissue, and other characteristics. As the band pass filter, an FIR (Finite Impulse Response) filter whose filter characteristic is determined by giving a number of tap coefficients may be used, the number of tap coefficients corresponding to a predetermined length in the direction di. The effect of suppressing acoustic noise can be enhanced by narrowing the width of a frequency passband of the filter characteristic. However, narrowing the width of the frequency passband may cause problems, such as a decrease in level of signals contributing to generation of an ultrasound image, or a decrease in resolution of the ultrasound image.

To circumvent such problems, the signal processor 36 may change filter characteristics based on the value (di, θj, Q) of the region determination information. For example, the signal processor 36 may set a first filter characteristic to the filter characteristic when the position (di, θj) belongs to the acoustic noise region; i.e., when Q=0, and set a second filter characteristic to the filter characteristic when the position (di, θj) belongs to the structure region; i.e., when Q=1. The first filter characteristic has a frequency passband width narrower than a frequency pass band of the second filter characteristic. When the filter is implemented by the FIR filter, the signal processor 36 changes values of a plurality of tap coefficients to be given to the filter, to thereby switch the filter characteristics between the first filter characteristic and the second filter characteristic.

The image processor 40 may perform image filtering, such as a smoothing filter operation and the morphological operation, on data of one frame of the ultrasound image generated based on the N sets of beam line data, for the purpose of reducing speckle noise and enhancing edges. In this case, the image processor 40 determines, for example, which of the closing operation or the opening operation is applied as the morphological operation to the data of the ultrasound image in accordance with the region determination information. That is, among the regions of the ultrasound image, the acoustic noise region may be processed through the opening operation, and the structure region may be processed through the closing operation.

Figure 10:
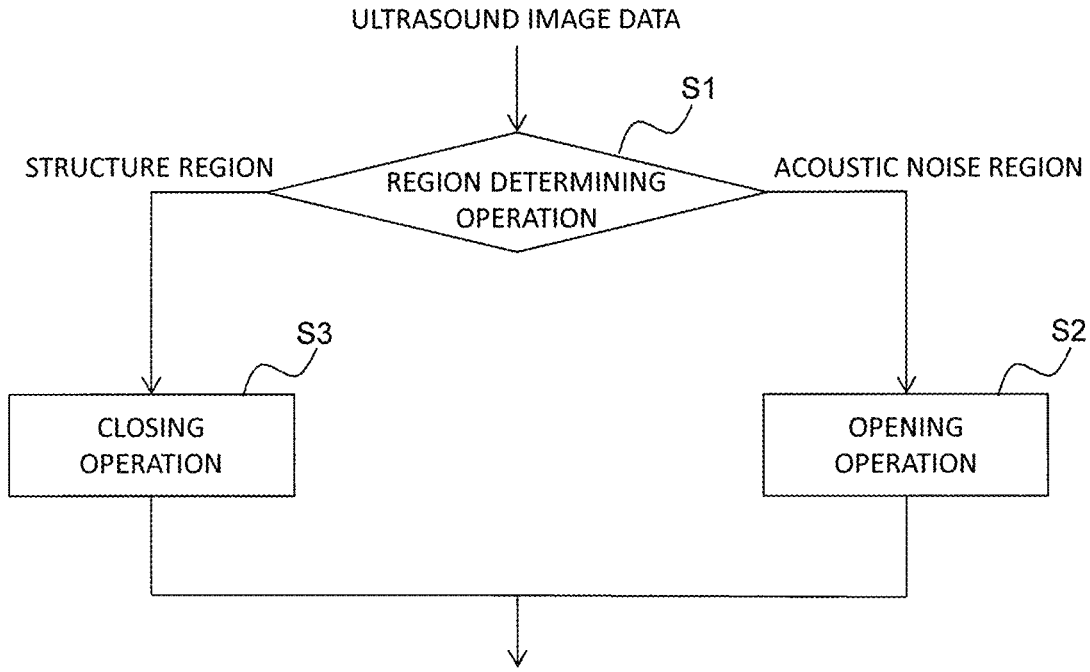
FIG. 10 shows a process performed by an image processor.

FIG. 10 shows an example of the image filtering performed by the image processor 40. The ultrasound image represented by ultrasound image data is divided into a plurality of image regions to be selected as a processing target, and below-described processing steps are performed on each of the image regions selected as the processing target. The image processor 40 performs the region determining process on the image region selected as the processing target from the image regions of the ultrasound image represented by the ultrasound image data (step S1). When an image region selected as the processing target is an acoustic noise region, the image processor 40 performs the opening operation on the selected image region (step S2). On the other hand, when the image region selected as the processing target is a structure region, the image processor 40 performs the closing operation on the selected image region (step S3). The image processor 40 performs steps S1 to S3 on each of the plurality of image regions to be selected as the processing target. The display unit 42 displays an ultrasound image generated based on the ultrasound image data acquired by performing the above-described morphological operation.

The acoustic noise region includes, as noise, a locally existing large pixel value in a region of small pixel values. For this reason, the opening operation in which the erosion (reducing operation) may be initially performed on the acoustic noise region, to thereby reduce the locally existing noise, which can, in turn, improve visibility. In the structure region, on the other hand, a region having a small pixel value locally exists in a region having large pixel values. For this reason, the closing operation in which the dilation (expanding operation) may be initially performed on the structure region, to thereby fill the locally existing region having the small pixel value, which can smooth pixel values in the structure region and accordingly improve visibility.

The image processor 40 may determine, based on the region determination information, a range of an image region that is associated with a region where values other than 0 are obtained by a structure function used for the morphological operation. For example, the image processor 40 may perform the morphological operation on the acoustic noise region, using a structure function which yields values other than 0 in a broader range of the region than that in the structure region, and may perform the morphological operation on the structure region, using a structure function which yields values other than 0 in a narrower range of the region than that in the acoustic noise region. In general, as the range of the image region to be associated with the region of values other than 0 in the structure function becomes broader, both the noise reducing effect and the smoothing effect are increased, while a resolution is decreased. Therefore, when the range of the image region to be associated with the region of values other than 0 is specified based on the region determination information, the morphological operation can be performed on the acoustic noise region with a preferential intention of exerting the noise reducing effect and performed on the structure region with a preferential intention of improving the resolution.

In the above description, the embodiment is presented in which the ultrasound beam is sector-scanned, and a position within the living tissue is identified by the depth di and the azimuth angle θj. Meanwhile, the ultrasound beam may be scanned using other scan modes, such as a convex scan mode or a linear scan mode. In this case, the position within the living tissue is identified using a coordinate system that matches a scan mode to be utilized. For example, in the linear scan mode, when a depth direction is defined as an x axis direction, and an ultrasound beam is scanned along a y axis direction perpendicular to the x axis direction, the position within the living tissue is identified by a position (xi, yj) in an x-y coordinate system. In any of the scan modes, the image processor 40 performs appropriate coordinate conversion on beam line data, to generate ultrasound image data used by the display unit 42 to display an ultrasound image.

The invention claimed is:

1. An ultrasound image processing apparatus comprising a processor and a non-transitory medium embodying a program of instructions executable by the processor to configure said ultrasound image processing apparatus to perform a method comprising:

performing a delay process to individually delay reception signals which are respectively output from a plurality of transducers contained in an ultrasound probe;

combining the delayed reception signals for generating a phase-aligned reception signal for each of a plurality of reception beams generated by a scan;

determining a noise evaluation value for the phase-aligned reception signal, based on the delayed reception signals;

performing a noise reducing process on the phase-aligned reception signal based on the noise evaluation value for generating a noise-reduced reception signal;

generating image data based on the noise-reduced reception signal; and determining an evaluation value distribution representing a distribution of noise evaluation values in a scanning region where the reception beams are scanned, the noise reducing process including performing an adjustment process on the noise evaluation value to generate a weight for the noise evaluation value and multiplying the phase-aligned reception signal by the weight, the adjustment process including performing on the evaluation value distribution a smoothing operation comprising a morphological operation including at least one of dilation and erosion, to generate the weight.

2. The ultrasound image processing apparatus according to claim 1, wherein the method further comprises:

performing an operation based on a coherence factor method on each of the delayed reception signals, to find the noise evaluation value.

3. The ultrasound image processing apparatus according to claim 1, wherein the method further comprises:

performing, on each of the delayed reception signals, a first weighted sum operation based on a first reception aperture function and a second weighted sum operation based on a second reception aperture function; and determining the noise evaluation value based on a cross-correlation operation to identify cross correlation between a signal acquired by the first weighted sum operation and a signal acquired by the second weighted sum operation.

4. The ultrasound image processing apparatus according to claim 1, wherein the adjustment process includes acquiring the weight for the noise evaluation value based on a conversion function of associating the noise evaluation value with the weight, and the conversion function gives a lower limit to the weight.

5. An ultrasound image processing apparatus comprising a processor and a non-transitory medium embodying a program of instructions executable by the processor to configure said ultrasound image processing apparatus to perform a method comprising:

performing a delay process to individually delay reception signals which are respectively output from a plurality of transducers contained in an ultrasound probe;

combining the delayed reception signals for generating a phase-aligned reception signal;

determining a noise evaluation value for the phase-aligned reception signal, based on the delayed reception signals;

performing a noise reducing process on the phase-aligned reception signal based on the noise evaluation value for generating a noise-reduced reception signal; and generating image data based on the noise-reduced reception signal, the noise reducing process including performing an adjustment process on the noise evaluation value to generate a weight for the noise evaluation value and multiplying the phase-aligned reception signal by the weight, the adjustment process including acquiring the weight for the noise evaluation value based on a conversion function of associating the noise evaluation value with the weight, the conversion function giving a lower limit to the weight, the conversion function having been selected from a plurality of different candidate functions of associating the noise evaluation value with the weight, based on a position in a depth direction where the noise evaluation value is obtained, and each of the plurality of candidate functions giving a different lower limit to the weight.

6. The ultrasound image processing apparatus according to claim 1, wherein the method further comprises:

generating the phase-aligned reception signal for each of the plurality of reception beams generated by the scan;

determining a weight distribution representing a distribution of weights in the scanning region where the reception beams are scanned; and determining, based on the weight distribution, whether a region contained in an image represented by the image data is an acoustic noise region or a structure region which is not the acoustic noise region.

7. The ultrasound image processing apparatus according to claim 6, wherein the method further comprises:

applying band pass filters to the phase-aligned reception signal, the band pass filters being different between the acoustic noise region and the structure region.

8. The ultrasound image processing apparatus according to claim 6, wherein the method further comprises:

applying image filters to the image data, the image filters being different between the acoustic noise region and the structure region.

9. An ultrasound image processing apparatus comprising a processor and a non-transitory medium embodying a program of instructions executable by the processor to configure said ultrasound image processing apparatus to perform a method comprising:

performing a delay process to individually delay reception signals which are respectively output from a plurality of transducers contained in an ultrasound probe;

combining the delayed reception signals for generating a phase-aligned reception signal;

determining a noise evaluation value for the phase-aligned reception signal, based on the delayed reception signals;

performing a noise reducing process on the phase-aligned reception signal based on the noise evaluation value for generating a noise-reduced reception signal;

generating image data based on the noise-reduced reception signal;

generating the phase-aligned reception signal for each of a plurality of reception beams generated by a scan, the method further including the following aspects (i) or (ii):

(i) the noise reducing process including performing an adjustment process on the noise evaluation value to generate a weight for the noise evaluation value and multiplying the phase-aligned reception signal by the weight, determining a weight distribution representing a distribution of weights in a scanning region where the reception beams are scanned, and determining, based on the weight distribution, whether a region contained in an image represented by the image data is an acoustic noise region or a structure region which is not the acoustic noise region;

(ii) determining an evaluation value distribution representing a distribution of noise evaluation values in a scanning region where the reception beams are scanned, determining, based on the evaluation value distribution, whether a region contained in an image represented by the image data is an acoustic noise region or a structure region which is not the acoustic noise region; and applying image filters to the image data, the image filters being different between the acoustic noise region and the structure region, and performing an opening operation on the acoustic noise region and performing a closing operation on the structure region wherein the acoustic noise region and the structure region are both contained in an image represented by the image data.

10. The ultrasound image processing apparatus according to claim 1, wherein the method further comprises:

generating the phase-aligned reception signal for each of the plurality of reception beams generated by the scan; and determining, based on the evaluation value distribution, whether a region contained in an image represented by the image data is an acoustic noise region or a structure region which is not the acoustic noise region.

11. The ultrasound image processing apparatus according to claim 10, wherein the method further comprises:

applying band pass filters to the phase-aligned reception signal, the band pass filters being different between the acoustic noise region and the structure region.

12. The ultrasound image processing apparatus according to claim 10, wherein the method further comprises:

applying image filters to the image data, the image filters being different between the acoustic noise region and the structure region.

13. The ultrasound image processing apparatus according to claim 9, wherein the method further comprises:

performing an operation based on a coherence factor method on each of the delayed reception signals, to find the noise evaluation value.

14. The ultrasound image processing apparatus according to claim 9, wherein the method further comprises:

performing, on each of the delayed reception signals, a first weighted sum operation based on a first reception aperture function and a second weighted sum operation based on a second reception aperture function; and finding the noise evaluation value based on a cross-correlation operation to identify cross correlation between a signal acquired by the first weighted sum operation and a signal acquired by the second weighted sum operation.

15. The ultrasound image processing apparatus according to claim 9, wherein the method further comprises:

applying band pass filters to the phase-aligned reception signal, the band pass filters being different between the acoustic noise region and the structure region.

16. The ultrasound image processing apparatus according to claim 9, wherein the method further comprises:

applying image filters to the image data, the image filters being different between the acoustic noise region and the structure region.

17. The ultrasound image processing apparatus according to claim 5, wherein the method further comprises:

performing an operation based on a coherence factor method on each of the delayed reception signals, to find the noise evaluation value.

18. The ultrasound image processing apparatus according to claim 5, wherein the method further comprises:

performing, on each of the delayed reception signals, a first weighted sum operation based on a first reception aperture function and a second weighted sum operation based on a second reception aperture function; and finding the noise evaluation value based on a cross-correlation operation to identify cross correlation between a signal acquired by the first weighted sum operation and a signal acquired by the second weighted sum operation.

19. The ultrasound image processing apparatus according to claim 5, wherein the method further comprises:

generating the phase-aligned reception signal for each of a plurality of reception beams generated by a scan;

determining an evaluation value distribution representing a distribution of noise evaluation values in a scanning region where the reception beams are scanned; and determining, based on the evaluation value distribution, whether a region contained in an image represented by the image data is an acoustic noise region or a structure region which is not the acoustic noise region.

\*  \*  \*  \*  \*